US006995797B2

(12) United States Patent
Takayanagi

(10) Patent No.: US 6,995,797 B2
(45) Date of Patent: Feb. 7, 2006

(54) CHARGE DETECTING DEVICE FOR A SOLID STATE IMAGING DEVICE

(75) Inventor: Isao Takayanagi, Kamiina-gun (JP)

(73) Assignee: Olympus Optical Co., Ltd., Tokyo (JP)

( * ) Notice: Subject to any disclaimer, the term of this patent is extended or adjusted under 35 U.S.C. 154(b) by 65 days.

(21) Appl. No.: 10/818,579

(22) Filed: Apr. 6, 2004

(65) Prior Publication Data

US 2004/0183549 A1 Sep. 23, 2004

Related U.S. Application Data

(62) Division of application No. 09/598,055, filed on Jun. 21, 2000, now Pat. No. 6,781,627.

(30) Foreign Application Priority Data

Jun. 24, 1999 (JP) ................................ 11-178388
Dec. 14, 1999 (JP) ................................ 11-354415

(51) Int. Cl.
*H04N 5/335* (2006.01)

(52) U.S. Cl. ...................................... 348/308; 348/301

(58) Field of Classification Search ................ 348/308, 348/300, 301
See application file for complete search history.

(56) References Cited

U.S. PATENT DOCUMENTS 4,733,077 A 3/1988 Gaalema et al.
5,335,008 A * 8/1994 Hamasaki .................. 348/301
5,514,985 A 5/1996 Chern
6,339,363 B1 1/2002 Fowler
6,532,040 B1 3/2003 Kozlowski et al.
6,670,990 B1 12/2003 Kochi et al.
6,759,641 B1 * 7/2004 Loose ..................... 250/208.1
2004/0012697 A1 * 1/2004 Rossi ......................... 348/308
2004/0233309 A1 * 11/2004 Egawa et al. ............... 348/301

FOREIGN PATENT DOCUMENTS

JP 50-134393 10/1975
JP 56-46374 A 4/1981

(Continued)

OTHER PUBLICATIONS

Chamberlain, Savvas G. "Photosensitivity and Scanning of Silicon Image Detector Arrays" IEEE Journal of Solid-State Circuits, vol. sc-4, No. 6, Dec. 1969, pp. 333-342.

*Primary Examiner*—Tuan Ho
(74) *Attorney, Agent, or Firm*—Frishauf, Holtz, Goodman & Chick, P.C.

(57) ABSTRACT

Each pixel of a solid state imaging element includes a photodiode, a field effect transistor (FET) having a gate connected to an output of the photodiode, a first feedback circuit connecting the gate and drain of the FET with a first switch inserted in series in a middle thereof, a second feedback circuit connecting the gate and drain of the FET with a second switch and a first capacitor in series in a middle thereof, and a second capacitor connected between a middle of the first capacitor and the second switch and an electric potential. A charge detector includes a capacitor, an amplifier having a negative input connected to the capacitor, a reset switch connected in a feedback circuit connecting an output of the amplifier and the negative input of the amplifier, and at least one circuit connected in parallel with the feedback circuit and having an additional reset switch connecting an output of the amplifier and the negative input of the amplifier and an additional capacitor.

5 Claims, 9 Drawing Sheets

FOREIGN PATENT DOCUMENTS

| | | | |
|---|---|---|---|
| JP | 57-202118 | A | 12/1982 |
| JP | 58-104524 | A | 6/1983 |
| JP | 63-86471 | A | 4/1988 |
| JP | 8-4127 | B2 | 1/1996 |

* cited by examiner

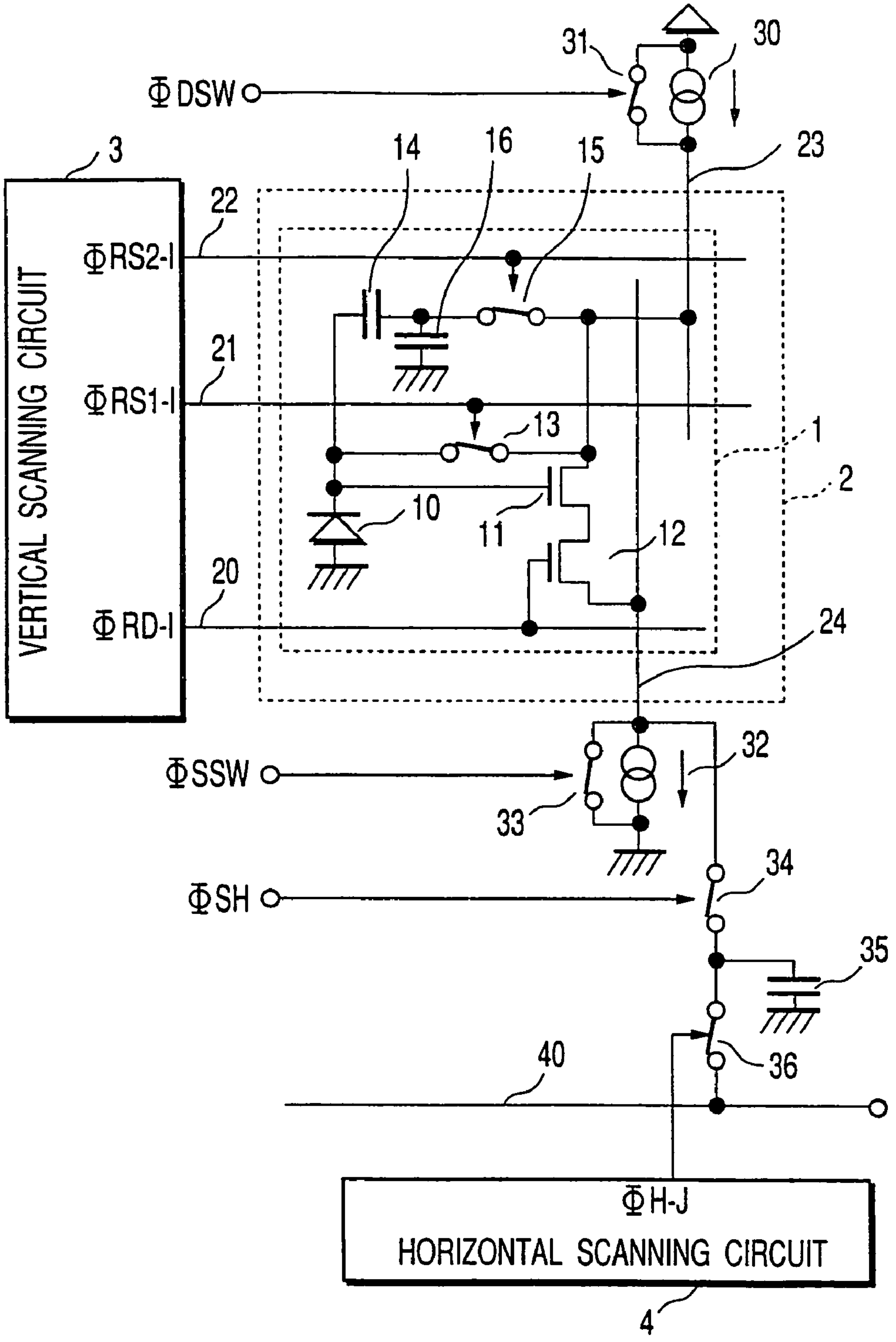
F I G. 1

HORIZONTAL SYNCHRONOUS TIMING
ΦH-J
ΦRD-I
ΦRS1-I
ΦRS2-I
ΦSSW
ΦDSW
ΦSH
VRS
VPIX
VSPIX
VDPIX
HORIZONTAL BLANKING PERIOD
ΔV1
ΔV2
t0
t1
t2
t3
t4
t5
t6
t7
t

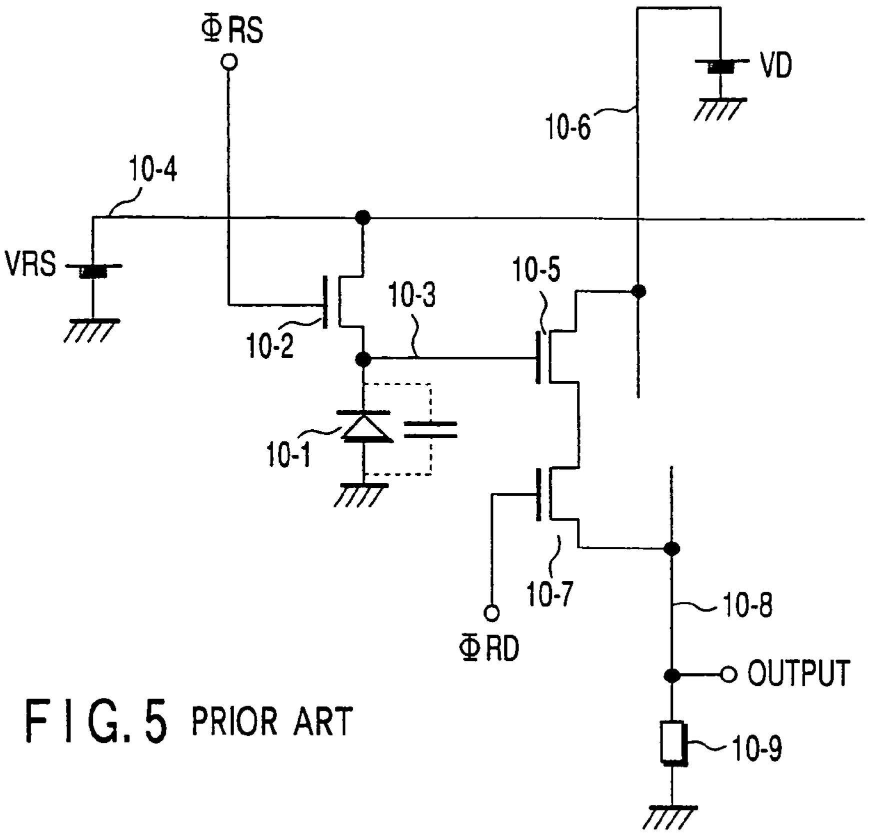
FIG. 5 PRIOR ART
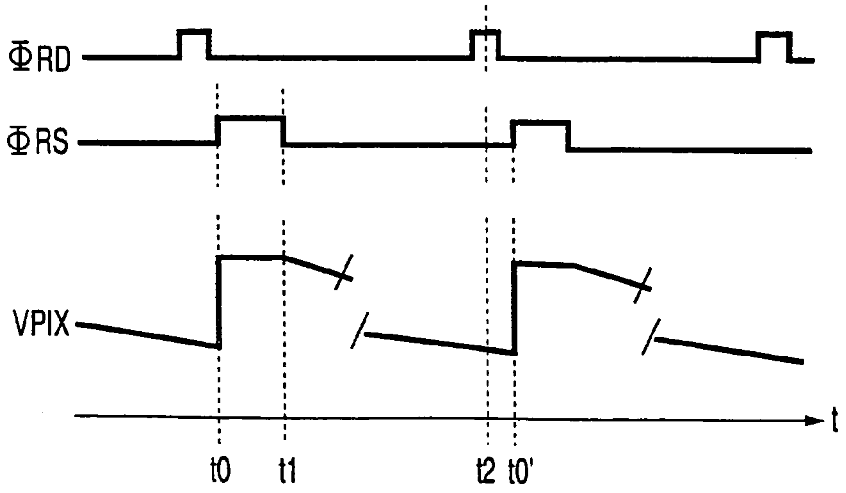
FIG. 6A PRIOR ART
FIG. 6B PRIOR ART
FIG. 6C PRIOR ART

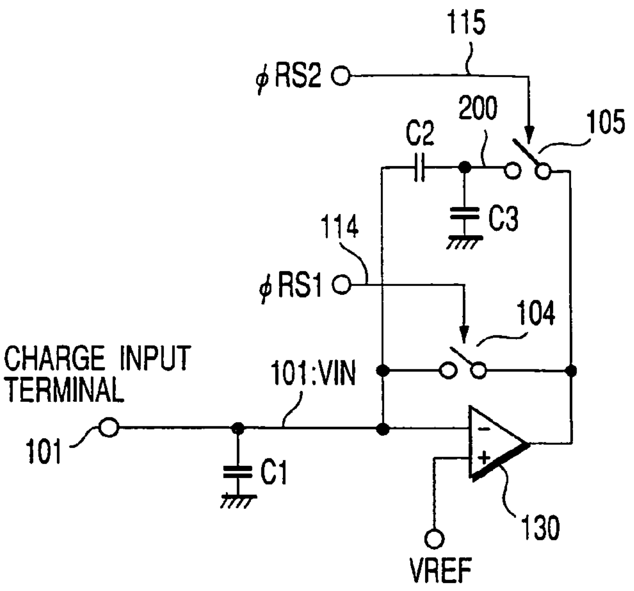
FIG. 9
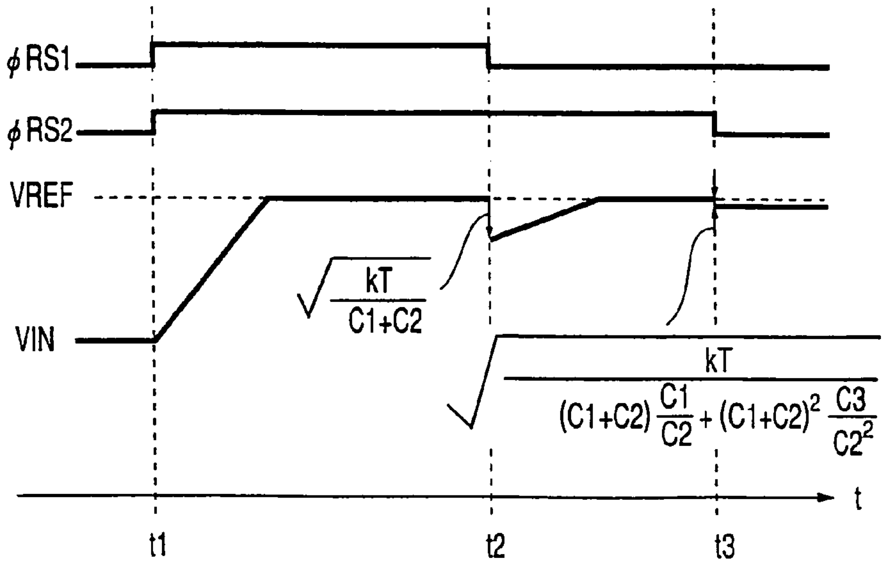
FIG. 10A
FIG. 10B
FIG. 10C
$$\sqrt{\frac{kT}{C1+C2}}$$
$$\sqrt{\frac{kT}{(C1+C2)\frac{C1}{C2}+(C1+C2)^2\frac{C3}{C2^2}}}$$

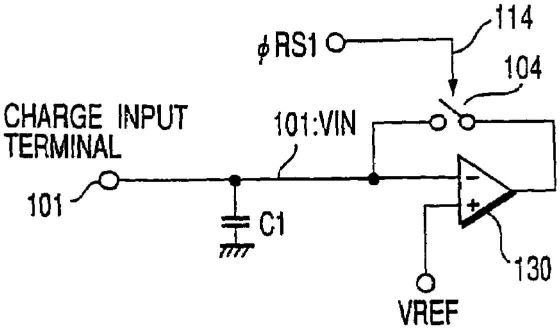
FIG. 11
(PRIOR ART)
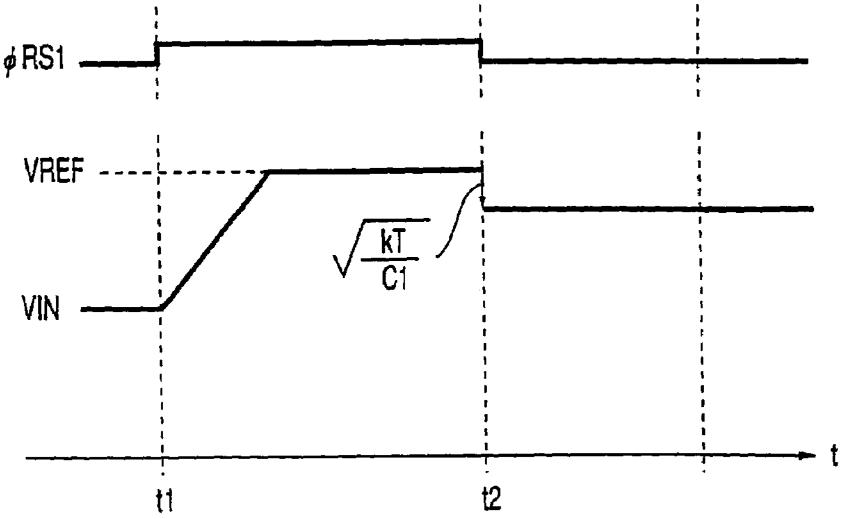
FIG. 12A
(PRIOR ART)
FIG. 12B
(PRIOR ART)

CHARGE DETECTING DEVICE FOR A SOLID STATE IMAGING DEVICE

CROSS-REFERENCE TO RELATED APPLICATIONS

The present application is a divisional application of U.S. application Ser. No. 09/598,055 filed Jun. 21, 2000 now U.S. Pat. No. 6,781,627 which is based upon and claims the benefit of priority from the prior Japanese Patent Applications No. 11-178388 filed Jun. 24, 1999; and No. 11-354415 filed Dec. 14, 1999, the entire contents of which are incorporated herein by reference.

BACKGROUND OF THE INVENTION

The present invention relates to a charge detecting device, and more particularly to a solid state imaging element and a solid state imaging device using a CMOS image sensor of a low noise amplification type which can implement a high picture quality, and a charge detecting device requiring signal charge detection having high precision which is to be used in a comparator or the like for an analog digital converter (ADC).

As the solid state imaging element, conventionally, a function of amplifying a charge signal photoelectrically converted in a pixel has been provided. Consequently, the invention for enhancing the characteristic of the image sensor has been made and put into practical use.

As a pixel having the function of amplifying the photoelectrically converted signal, thus, there has been proposed a method of providing, on a pixel, a signal amplifying circuit constituted by an MOS type field effect transistor as is disclosed in IEEE Journal of Solid-State Circuits, vol. SC-4, No. 6 (1969) "Photosensitivity and Scanning of Silicon Image Detector Arrays" and Jpn. Pat. Appln. KOKAI Publication No. 50-134393.

An MOS image sensor in which a pixel is constituted by an MOS type field effect transistor can be manufactured in a process almost similar to that of a general-purpose CMOS. Therefore, the manufacture can easily be carried out and a simple power source can be used because an ordinary CMOS clock is enough for a driving pulse and an operation can be performed with a single power source. In addition, it is easy to integrate a CMOS digital circuit and an analog circuit in the same chip.

Such an MOS image sensor has some excellent features as compared with a CCD image sensor, for example, an image sensor having a multifunction can be constituted. In recent years, consequently, attention has been mainly paid to the MOS image sensor as an image sensor to be incorporated in a portable imaging device which requires low power consumption and a reduction in a size.

FIG. 5 shows a conventional amplification type pixel constituted by the MOS type field effect transistor.

First of all, an amplification type pixel constituted by the conventional MOS type field effect transistor will be described with reference to FIG. 5.

FIG. 5 illustrates the structure of a unit pixel by using an equivalent circuit.

In FIG. 5, the reference numeral 10-1 denotes a photodiode for generating an electric charge through irradiated light.

Moreover, the reference numeral 10-2 denotes an MOS type field effect transistor for reset which serves to connect an N side electrode 10-3 of the photodiode 10-2 to a voltage wiring 10-4 of a reset voltage (source) VRS.

Furthermore, the reference numeral 10-5 denotes an MOS type field effect transistor for amplification which has a gate electrode connected to the N side electrode 10-3 of the photodiode 10-1 and a drain electrode side connected to a voltage wiring 10-6 of a voltage power source VD.

The reference numeral 10-7 denotes an MOS type field effect transistor for pixel selection which has a drain electrode connected to a source electrode of the MOS type field effect transistor 10-5 for amplification and has a source electrode connected to a signal output wiring 10-8.

The signal output wiring 10-8 is grounded at an output terminal through a load circuit 10-9 and serves to output a signal voltage depending on a voltage (VPIX) of the N side electrode 10-3 of the photodiode 10-1 through a source follower circuit which is equivalently constituted by the MOS type field effect transistor 10-5 for amplification and the load circuit 10-9.

Next, the operation of the pixel shown in FIG. 5 will be described.

FIGS. 6A, 6B and 6C are timing charts illustrating the operation of a conventional pixel.

In FIGS. 6A, 6B and 6C, ΦRS denotes a pulse to be input to the gate electrode of the MOS type field effect transistor 10-2 for reset.

Moreover, ΦRD denotes a pulse to be input to the gate electrode of the MOS type field effect transistor 10-7 for pixel selection.

Furthermore, VPIX denotes a change in the electric potential of the N side electrode 10-3 of the photodiode 10-1.

First of all, ΦRS is set to H at a time t0, and the electric potential VPIX of the N side electrode 10-3 of the photodiode 10-2 is set to have a reset voltage VRS.

Next, the MOS transistor 10-2 for reset is turned off at t1, and the N side electrode 10-3 of the photodiode is brought into a floating state.

When light is incident on the pixel, an optical generating current flows to the photodiode 10-1 and electric charges of an electron optically generated are accumulated in the N side electrode 10-3 of the photodiode 10-1. Consequently, the electric potential VPIX is gradually dropped.

Next, when the MOS type field effect transistor 10-7 for pixel selection is turned on at a time t2, a voltage output corresponding to the electric potential VPIX of the N side electrode 10-3 of the photodiode 10-1 at the time t2 is output to the signal output wiring 10-8.

The VPIX depends on the amount of electric charges accumulated in the N side electrode 10-3 of the photodiode 10-1. Therefore, the output of the signal output wiring 10-8 is monitored so that the amount of the accumulated electric charges is estimated. After all, the amount of the incident light can be detected.

In the case in which each pixel has a signal amplifying function, it is necessary to consider that the picture quality of an output image should be prevented from being remarkably deteriorated due to noises generated on an output due to an offset variation.

Such a noise is fixed to a pixel position and is referred to as a fixed pattern noise (hereinafter referred to as "FPN").

For example, Jpn. Pat. Appln. KOKAI Publication No. 56-46374 has disclosed a general method of suppressing the generation of the FPN.

Moreover, Jpn. Pat. Appln. KOKAI Publication No. 08-004127 has disclosed an example of suppressing the generation of the FPN which is applied to an amplification type imaging element.

An FPN canceling method will be described below.

FIG. 7 simply shows the structure of an image device comprising a reading circuit for canceling the FPN.

In FIG. 7, the reference numeral 12-1 denotes a pixel array section constituted by a plurality of pixels 12-2 arranged two-dimensionally, for example, in a matrix.

Moreover, the reference numeral 12-3 denotes a vertical scanning circuit for selecting the row of the pixel array section 12-2.

Furthermore, the reference numeral 12-4 denotes a horizontal scanning circuit for selecting the output column of the pixel array section 12-2.

A selecting pulse input terminals and a reset pulse input terminals of the pixels in a row are connected to a row selecting line 12-5 and a row reset line 12-6 respectively, and are controlled with a scanning signal output from the vertical scanning circuit 12-3.

Moreover, the signal output terminals of the pixels in a column are connected to a signal output line 12-7, and a signal output to the signal output line 12-7 is input to an FPN canceling section 12-18 provided in column parallel.

The FPN canceling circuit 12-18 is constituted by two sample hold circuits including a switch 12-9, a capacitor 12-11, and a switch 12-10 and a capacitor 12-12.

The capacitor 12-11 is connected to a first video signal line 12-15 through a horizontal selecting switch 12-13, and the capacitor 12-12 is connected to a second video signal line 12-16 through a horizontal selecting switch 12-14.

These first video output line 12-15 and the second video output line 12-16 are connected to the positive and negative input terminals of a differential amplifier 12-17, respectively.

The differential amplifier 12-17 outputs a difference between signals input to the positive input terminal and the negative input terminal, respectively.

FIGS. 8A to 8E are timing charts illustrating the operation the imaging device comprising the FPN cancel reading circuit constituted as described above.

Next, an FPN canceling operation will be described based on a chart timing shown in FIGS. 8A to 8E.

First of all, a row selecting pulse ΦRD-I (i) is output from the vertical scanning circuit 12-3, and a pixels in a first row is selected simultaneously at a time t0 for a horizontal blanking period.

Next, a sample hold pulse ΦSH1 is set to H and the output voltage of the pixel 12-1 obtained after photoelectric charge accumulation is stored in the capacitor 12-11 at a time t1.

Then, after the pixel 12-1 is reset at a time t2, a sample hold pulse ΦSH2 is set to H at a time t3 and an output obtained after pixel resetting, that is, an offset output voltage is stored in the capacitor 12-12.

Thereafter, a horizontal selecting pulse ΦH-J is output from the horizontal scanning circuit 12-4, a signal stored in the capacitor 12-11 is output to the first video signal line 12-15 through the horizontal selecting switch 12-13 and the horizontal selecting switch 12-14 and a signal stored in the capacitor 12-12 is output to the second video signal line 12-16 for a horizontal scanning period.

The differential amplifier 12-17 outputs a difference between signals input from the first video signal line 12-15 and the second video signal line 12-16 to the positive input terminal and the negative input terminal, respectively.

With such a structure, it is possible to suppress the FPN caused by a variation in the characteristics of the pixel and the selecting switch.

However, also in the solid state imaging device having the FPN improved for reading, there is a further problem in that random noises remain.

As a main cause of the random noise, thermal noises made by resetting the photodiode section of the pixel have the greatest influence.

More specifically, in FIG. 5, when the photodiode 10-1 is to be reset, the voltage of the N side electrode 10-3 of the photodiode 10-1 fluctuates at the moment that the MOS type field effect transistor 10-2 for reset is turned off.

The N side electrode 10-3 of the photodiode 10-1 is connected to the gate electrode of the MOS type field effect transistor 10-5 for amplification to be used for reading. Therefore, when the voltage of the gate electrode of the field effect MOS transistor 10-5 for amplification to be used for reading fluctuates, there is a problem in that an offset fluctuation is generated on an output and the picture quality of an output image is remarkably deteriorated.

The voltage fluctuation of the N side electrode 10-3 of the photodiode 10-1 has a standard deviation of $(kT/C)^{1/2}$.

k represents a Boltzmann's constant, T represents an absolute temperature and C represents a total capacitance for a ground present equivalently to the N side electrode 10-3 of the photodiode 10-1.

The voltage fluctuation is randomly generated for each reset operation. Therefore, a difference between two-time reset operations shown in FIGS. 7 and 8A to 8E is taken so that $2^{1/2}$ multiplication is carried out in the operation for suppressing the FPN and a noise of $(2kT/C)^{1/2}$ is actually mixed into a video output.

In general, this noise is referred to as a reset noise or a kTC noise.

In a conventional amplification type CMOS pixel, there has been a problem in that a high sensitivity cannot be obtained due to the reset noise made by resetting the photodiode and the same CMOS pixel is not suitable for the use of high picture quality.

For example, in the case in which a pixel has a value C of 10 fF, a value of the reset noise at a room temperature is represented as approximately $60e^-$ in an equivalent input charge number which is several times as large as an ordinary CCD noise. Consequently, there is a problem in that the high picture quality cannot be obtained.

In order to suppress the reset noise or to perform improvement so as not to generate the reset noise, for example, it can also be proposed that the photodiode section of the pixel is constituted by a CCD element and an electric charge is completely transferred as in the CCD such that no electric charge is present in an electric charge accumulating section after resetting.

However, in the case in which the photodiode is to be implemented with a CCD structure, it is necessary to employ a structure in which the gate electrode of an MOS capacitor constituting the photodiode is made transparent such that light can be incident thereon and a transfer gate is provided. This is greatly different from a general-purpose CMOS process. Therefore, there is a problem in that a feature such as original manufacturing easiness is lost.

In a conventional technique, a method of suppressing a reset noise without greatly departing from the general-purpose CMOS process has not been proposed.

Conventionally, there has been proposed and practically utilized a signal charge detecting device to be used for the solid state imaging element in which a change in an input voltage signal is injected as a signal charge to a circuit through a capacitor and the change amount of an input voltage is calculated by using the injected signal charge.

In a CMOS circuit which has been remarkably advanced, recently, it is easy to constitute a capacitor element in a semiconductor process. Therefore, an analog circuit applying a capacitor element has actively been developed and utilized.

As an example, Jpn. Pat. Appln. KOKAI Publication No. 57-202118 has disclosed a comparator circuit constituted to inject an electric charge to an MOS inverter circuit through a capacitor element and a method of relieving the noise of the comparator circuit.

As a further application example, Jpn. Pat. Appln. KOKAI Publication No. 58-104524 has disclosed a method of constituting ADC by using the comparator circuit.

In the prior art, however, there has been a problem in that great thermal noises are made when the electric charges accumulated in the capacitor element for input are to be initialized (reset). In order to solve the problem, it is necessary to increase the size of the capacitor element for input.

Consequently, the input capacitor of the circuit is increased. As a result, there is a problem in that great power consumption is required for driving and the area is hard to reduce when the circuit is to be integrated on a chip.

By taking, as an example, the comparator circuit used in the conventional art, the above-mentioned problems will be explained for clearer designation.

FIG. 11 shows the structure of a conventional typical charge detecting device.

As shown in FIG. 11, a charge input terminal 101 is connected to a ground potential point through a capacitor C1 and is connected to the negative input terminal (−) of a differential amplifier circuit (amplifier circuit) 130.

The negative input terminal (−) of the amplifier circuit 130, that is, the charge input terminal 101 and the output terminal of the amplifier circuit 130 are connected to each other through a reset switch 104.

A first reset pulse RS1 is applied to a control terminal 114 of the reset switch 104.

A reference voltage VREF is input to the positive electrode (+) side of the amplifier circuit 130.

Even if the amplifier circuit 130 is replaced with an inverter circuit disclosed in the above-mentioned prior art, that is, Jpn. Pat. Appln. KOKAI Publication No. 57-202118 and Jpn. Pat. Appln. KOKAI Publication No. 58-104524, the basic operation is identical.

Next, the operation of the conventional charge detecting device shown in FIG. 11 will be described based on a timing chart shown in FIGS. 12A and 12B.

FIGS. 12A and 12B show a reset pulse RS1 applied to a control terminal 114 of the reset switch 104 and an electric potential VIN of the charge input terminal 101 in time series along an operation sequence.

For simplicity of explanation, the reset switch 104 is closed when the reset pulse RS1 has a positive logic.

First of all, the electric potential VIN of the charge input terminal 101 is optional in the initial state before a time t1.

When the reset pulse ΦRS1 is input at the time t1 and the reset switch 104 is closed, the output terminal and the negative input terminal (−) of the amplifier circuit 130 are short-circuited. Therefore, the amplifier circuit 130 operates as an analog buffer circuit.

Consequently, the electric potential VIN of the charge input terminal 101 is set to a reference voltage VREF through a finite ramping period.

Next, when the ΦRS1 is changed to open the reset switch 104 at a time t2, the charge input terminal 101 is brought into a floating state on a DC basis so that electric charges can be accumulated.

Then, signal charges are injected into the charge input terminal 101. Consequently, if the injected charge is positive, a negative potential is output to the output terminal of the amplifier circuit 130. If the injected charge is negative, a positive potential is output to the output terminal of the amplifier circuit 130.

More specifically, the present charge detecting device serves to operate as a charge detecting comparator for a negative output.

The conventional charge detecting device shown in FIG. 11 generates a thermal noise ΔVIN made with the switching operation of the reset switch 104.

The thermal noise ΔVIN is generated for the ground capacitor value of the charge input terminal 101 and a noise voltage expressed in Equation (1) is generated as a mean noise.

$$\Delta VIN(t=t2)=SQRT(kT/C1) \qquad (1)$$

wherein k represents a Boltzmann's multiplier and T represents an absolute temperature.

The noise voltage is randomly generated. As a result, the noise detecting limit of the electric detecting device is determined so that detection precision is deteriorated.

Furthermore, at the moment that the reset switch 104 is closed, a parasitic capacitor component present between the control terminal 114 of the reset switch 104 and the charge input terminal 101 and an electric charge forming the channel of the reset switch 104 are pushed out toward the charge input terminal 101 through a reset operation.

This is referred to as a feed through phenomenon. If the same phenomenon is present, an offset charge is equivalently generated. Consequently, there is a problem in that the initial potential of the charge input terminal 101 during resetting is shifted from a balancing point for a comparator.

BRIEF SUMMARY OF THE INVENTION

In order to eliminate the drawbacks of the conventional solid state imaging element, it is an object of the present invention to provide a solid state imaging element having a pixel structure and operation which can suppress a reset noise generated during the reset operation of a pixel and can implement a low noise and high picture quality that cannot be obtained in a conventional amplification type MOS pixel without greatly departing from a general-purpose CMOS process.

In order to eliminate the drawbacks of the conventional charge detecting device, it is another object of the present invention to provide a charge detecting device capable of reducing a thermal noise made by resetting the electric potential of a charge input terminal and an offset caused by feed through, thereby detecting an electric charge with high precision.

In order to attain the above-mentioned objects, as one embodiment the present invention presents a solid state imaging element having a plurality of pixels, each of the pixels comprising;

a photodiode;

a field effect transistor having a gate electrode connected to an output of the photodiode;

a first feedback circuit connecting the gate electrode and a drain electrode of the field effect transistor and having a first switch inserted in series in a middle thereof;

a second feedback circuit connecting the gate electrode and a drain electrode of the field effect transistor and having a second switch and a first capacitor inserted in series in a middle thereof; and a second capacitor having one of ends connected to a middle of the first capacitor and the second switch and having an electric potential on the other end fixed.

In order to attain the above-mentioned object, as another embodiment, the present invention provides a solid state imaging element having a plurality of pixels, each of the pixels comprising:

a first capacitor and a second capacitor which are inserted in series in a middle of an output line sent from the pixel; and a switching section for switching application of the output such that an output based on light receipt from the pixel is applied to only the first capacitor and an output obtained after resetting the pixel is applied to a series connecting portion of the first capacitor and the second capacitor.

In order to attain the above-mentioned objects, as yet another embodiment the present invention presents a charge detecting device comprising:;

a capacitor element;

an amplifier circuit having a negative input terminal connected to an input terminal of the capacitor element;

a reset switch connected in a feedback circuit connecting an output terminal of the amplifier circuit and the negative input terminal of the amplifier circuit; and at least one circuit connected in parallel with the feedback circuit and having a reset switch other than the reset switch connecting an output terminal of the amplifier circuit and the negative input terminal of the amplifier circuit and a capacitor element other than the capacitor element connected in series.

In order to attain the above-mentioned objects, as a further embodiment the present invention presents a charge detecting device comprising:

an amplifier circuit;

a first capacitor element having one of ends connected to a negative input terminal of the amplifier circuit and the other end grounded;

a first feedback circuit connecting an output terminal and the negative input terminal of the amplifier circuit and having a first reset switch in a middle;

a second feedback circuit connecting the output terminal and the negative input terminal of the amplifier circuit and having a second reset switch and a second capacitor element connected in series in a middle; and a third capacitor element having one of ends connected in a middle of the second reset switch and the second capacitor element and the other end grounded.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention.

FIG. 1 is a diagram illustrating the structure of a solid state imaging element according to a first embodiment of the present invention;

FIG. 5 is a diagram showing a conventional amplification type pixel constituted by an MOS type field effect transistor;

FIGS. 6A, 6B and 6C are timing charts illustrating the operation of the conventional pixel;

FIG. 9 is a connection diagram showing the schematic structure of a charge detecting device according to an embodiment of the present invention;

FIGS. 10A, 10B and 10C are timing charts illustrating the operation and driving method of the charge detecting device according to the embodiment of the present invention;

FIG. 11 is a diagram showing the schematic structure of a conventional charge detecting device; and FIGS. 12A and 12B are timing charts illustrating the operation and driving method of the conventional charge detecting device.

DETAILED DESCRIPTION OF THE INVENTION

Figures 2A, 2B, 2C, 2D, 2E, 2F, 2G, 2H, 2I, 2J, 2K:
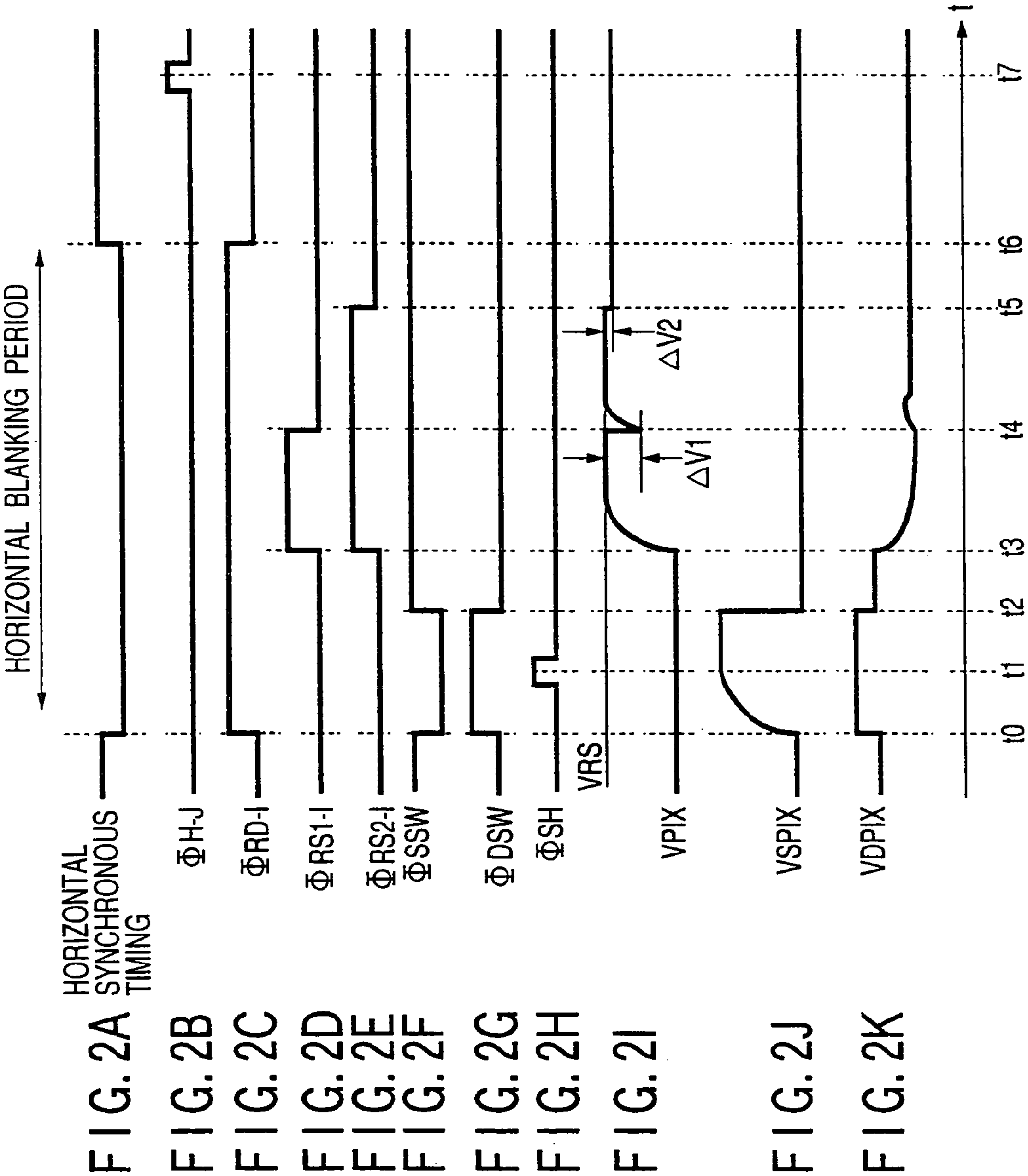
FIGS. 2A to 2K are timing charts showing the operation of the solid state imaging element according to the first embodiment of the present invention.

Reference will now be made in detail to the presently preferred embodiments of the invention as illustrated in the accompanying drawings, in which like reference numerals designate like or corresponding parts.

An embodiment of the present invention will be described below with reference to the drawings.

First of all, a first embodiment of the present invention will be described specifically.

(First Embodiment)

FIG. 1 shows the structure of a solid state imaging element according to the first embodiment of the present invention.

As shown in FIG. 1, a pixel unit 1 to be the unit of a pixel array 2 is constituted by a photodiode 10, an MOS type field effect transistor 11 for reading amplification of a predetermined first conductivity type which has a gate electrode thereof connected to the N side electrode of the photodiode 10, an MOS type field effect transistor 12 for row selection of a predetermined first conductivity type which is connected to the MOS type field effect transistor 11 for reading amplification in series, a first reset switch 13 provided between the photodiode 10 and the drain electrode of the MOS type field effect transistor 11 for reading amplification, a feedback capacitor 14 and a second reset switch 15 which are provided between the drain electrode of the MOS type field effect transistor 11 for reading amplification and the photodiode 10, and a buffer capacitor 16 connected between a connecting point of the feedback capacitor 14 and the second reset switch 15 and a ground terminal.

As shown in FIG. 1, moreover, the pixel array 2 is constituted by the unit pixel 1 two-dimensionally arranged in a matrix, for example.

The gate electrode of the MOS type field effect transistor 12 for row selection of the unit pixel 1 is connected in common for each row through a row selecting line 20.

Furthermore, the control electrode of the first reset switch 13 is connected in common for each row through a first row reset wiring 21, and the control electrode of the second reset switch 15 is connected in common for each row through a second row reset wiring 22.

Moreover, the row selecting line 20, the first reset wiring 21 and the second reset wiring 22 are connected to a vertical scanning circuit 3, respectively.

The drain electrode of the MOS type field effect transistor 11 for reading amplification of the pixel unit 1 is connected in common for each column through a pixel drain wiring 23, and is connected to a positive side power source through a constant current source 30 independently for each column.

A switch 31 is provided on both ends of the constant current source 30 in parallel with the constant current source 30.

On the other hand, the source electrode of the MOS type field effect transistor 12 for row selection is connected in common for each column through a pixel source wiring 24, and is connected to a negative side power source through a second constant current source 32 independently for each column.

A switch 33 is provided on both ends of the constant current source 32 in parallel with the constant current source 32.

For simplicity of explanation, only a pixel on the coordinates in an Ith row and a Jth column which constitutes the pixel array 2 is described in the present embodiment.

Moreover, the pixel source wiring 24 in each column is connected to a sample hold capacitor 35 through a sample hold switch 34.

A horizontal selecting switch 36 is provided between the sample hold capacitor 35 and a video output line 40.

The control terminal of the horizontal selecting switch 36 is connected to a horizontal scanning circuit 4.

FIGS. 2A to 2K are timing charts illustrating the operation of the solid state imaging element having such a structure.

With reference to the timing charts of FIGS. 2A to 2K, the operation of the solid state imaging element having the above-mentioned structure will be described below.

ΦRD-I denotes a pulse to be output to the row selecting line 20 of an Ith pixel, ΦRS1-I denotes a pulse to be output to the first reset wiring 21 of the Ith pixel, ΦRS2-I denotes a pulse to be output to the second reset wiring 22 of the Ith pixel, ΦDSW denotes a pulse to be input to the control electrode of the pixel drain wiring side switch 31, ΦSSW denotes a pulse to be input to the control electrode of the pixel source wiring side switch 33, ΦSH denotes a pulse to be input to the control terminal of the sample hold switch 34, and ΦH-J denotes a horizontal selecting pulse to be input to the control terminal of the horizontal selecting switch 36 in the Jth column.

In FIGS. 2A to 2K,

VPIX denotes an electric potential of the gate electrode of the MOS type field effect transistor 11 for reading amplification of a pixel positioned in the Ith row and the Jth column, VDPIX denotes an electric potential of a pixel drain wiring in the Jth column, and VSPIX denotes an electric potential of a pixel source wiring in the Jth column.

For simplicity of explanation, the above-mentioned switch is conducted when the input of each control terminal has the High level (H) and is non-conducted when the input has the Low level (L).

Moreover, each switch is an ideal switch. As shown, it is possible to disregard the influence of the injection of feed through charges and a parasitic capacitor with a control pulse through a switching operation.

First of all, ΦRD-I is set to H and the MOS type field effect transistor 12 for row selection of pixels in a Ith row are turned on at a time t0 for a horizontal blanking period.

At this time, ΦSSW is L and ΦDSW is H. Therefore, a source follower circuit is constituted by the MOS type field effect transistor 11 for reading amplification of the pixel 1 and the source side constant current source 32, and a voltage which is proportional to the electric potential of the VPIX is follower output to the pixel source wiring 24.

Next, the ΦSH is set to H at a time t1, and the follower output-sent to the pixel source wiring 24 is stored in the sample hold capacitor 35.

When the ΦSSW is set to H and the ΦDSW is set to L at a time t2, the drain side constant current source 30 and the MOS type field effect transistor 11 for reading amplification of the pixel 1 constitute an inverter circuit.

In this state, when both the ΦRS1-I and ΦRS2-I are set to H and the first reset switch 13 and the second reset switch 15 are turned on at a time t3, the input and output terminals of the inverter circuit are short-circuited. Consequently, the electric potential VPIX of the gate electrode of the MOS type field effect transistor 11 for reading amplification is reset to have a predetermined voltage VRS.

In this state, when only the ΦRS1 is set to L and the first reset switch 13 is turned off at a time t4, a reset noise to be ΔV1 appears on the VPIX.

However, the second reset switch 15 is on at this time. Therefore, the inverter circuit constituted by the drain side constant current source 30 and the MOS type field effect transistor 11 for reading amplification of the pixel 1 functions as an inversion amplifying circuit and applies a negative feedback through a feedback capacitor 14 such that the VPIX is set to be the VRS.

At a time t5 that the feedback operation is fully stabilized, the ΦRS2-I is switched to L and the second reset switch 15 is turned off. Consequently, a reset noise ΔV2 is generated again.

A voltage fluctuation generated by the reset noise ΔV2 is suppressed through the buffer capacitor 16, and the generated voltage fluctuation is further suppressed in such an amount as to be transmitted to the VPIX through a series connection of the feedback capacitor 14 and the photodiode.

Then, the horizontal blanking period is terminated and the horizontal scanning period is started at t6.

Next, the horizontal selecting pulse ΦH-J in the Jth column is output from the horizontal scanning circuit 4 at a time t7 and a signal of the pixel in the Ith line and Jth column is output to the video output line 40.

In this case, the reset noise generated during the reset of the pixel unit 1 is suppressed. Therefore, the influence of the reset noise for the output of the read pixel is more reduced than that in a conventional pixel structure.

Next, the description for the effect of suppressing the reset noise according to the present invention will be supplemented.

The standard deviation of the voltage fluctuation of the generated by the closing operation of the second reset switch 15 is obtained from the following equation, wherein the accumulation capacity of the photodiode 10 is represented as CPD, the capacity value of the feedback capacitor 14 is represented as CFB and the capacity value of the buffer capacitor 16 is represented as CP.

$$\Delta VPIX=SQR[kT((CPD+CFB)\times CPD/CFB)+(CPD+CFB)\times(CPD+CFB)\times CP/(CFB\times CFB))]$$

When the voltage fluctuation ΔPIXO of the without a capacitor feedback for convenience is set to $$\Delta PIXO=SQR[kT/(CPD+CFB)],$$

a suppression ratio $$=SQR[1/(CPD/CFB+(CPD+CFB)\times CP/(CFB\times CFB)]$$

is obtained.

For example, i CPD:CFB:CP=5:1:2 is set, the suppression ratio of the reset noise is set to approximately ¼. Consequently, it is possible to greatly improve the generation of a fluctuation due to the reset operation of a pixel electrode.

(Second Embodiment)

Figure 3:
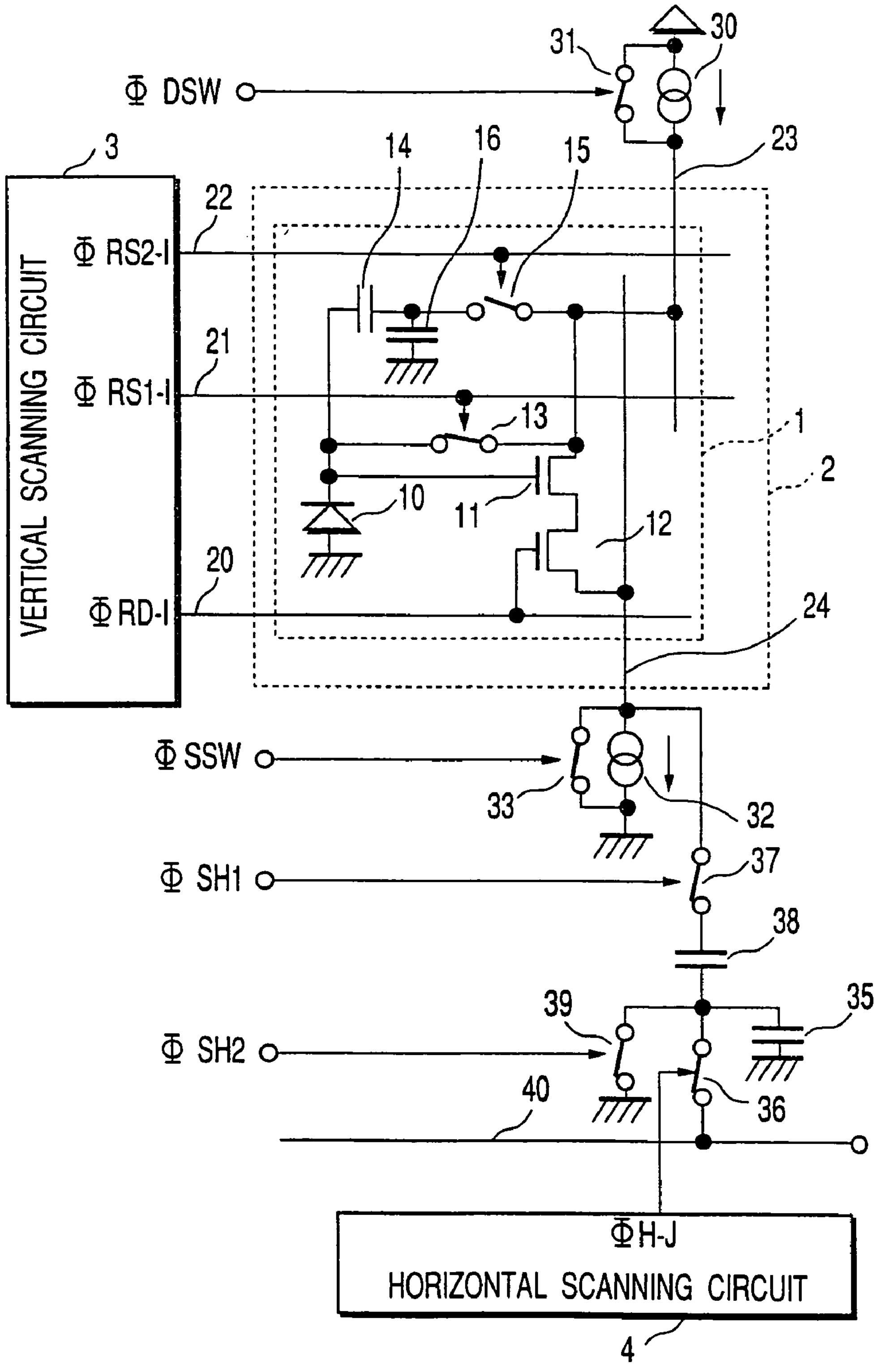
FIG. 3 is a diagram illustrating the structure of a solid state imaging element according to a second embodiment of the present invention.
Figures 4A, 4B, 4C, 4D, 4E, 4F, 4G, 4H, 4I:
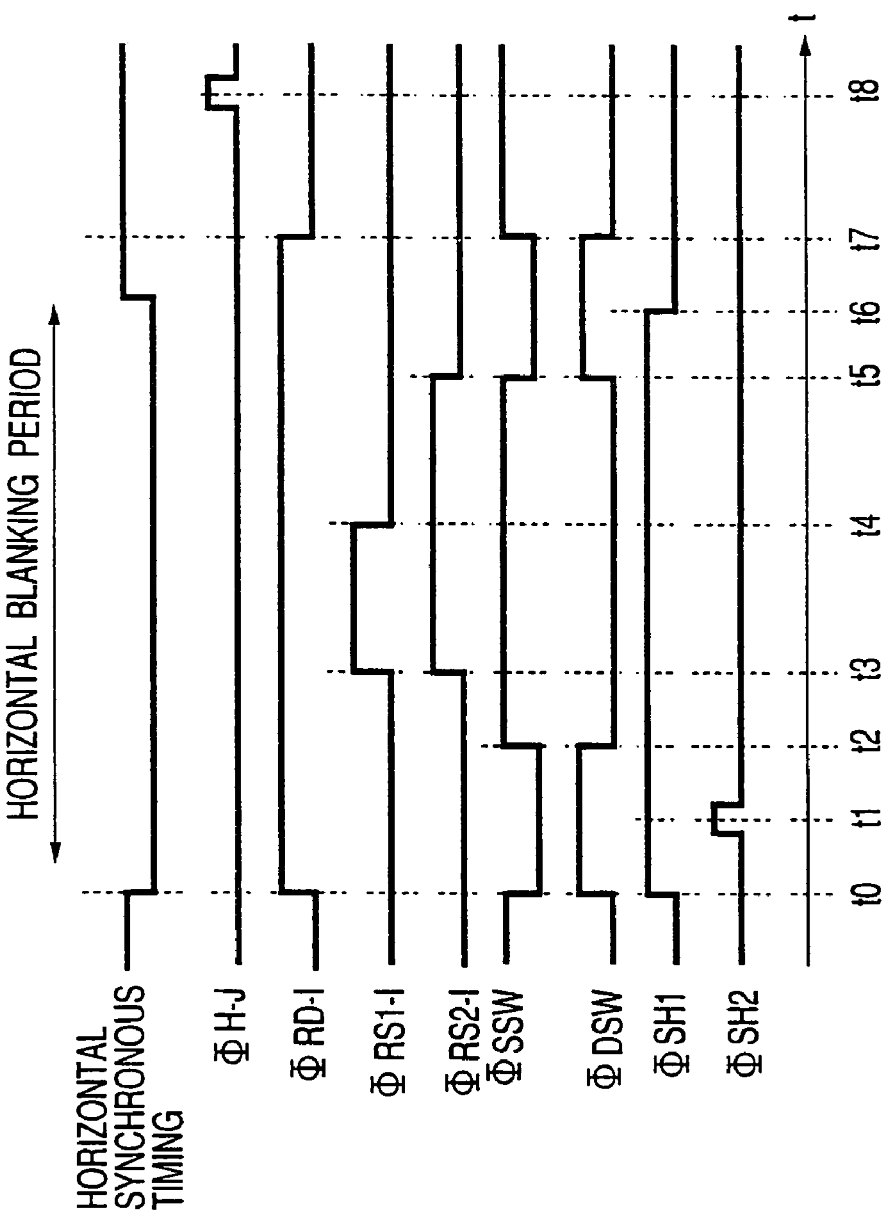
FIGS. 4A to 4I are timing charts showing the operation of the solid state imaging element according to the second embodiment of the present invention.
Figure 7:
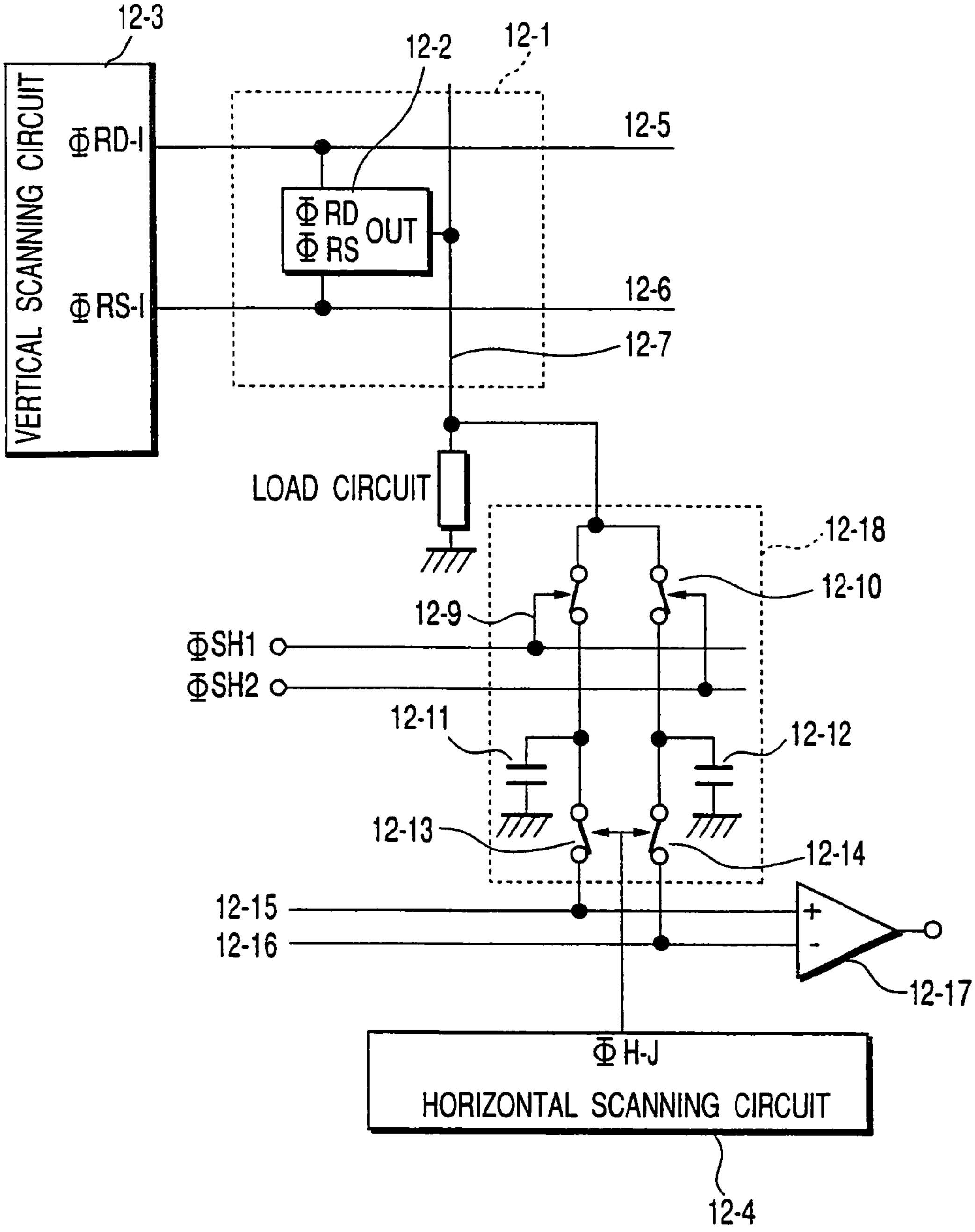
FIG. 7 is a diagram simply showing the structure of a conventional imaging device comprising a reading circuit for canceling FPN.
Figures 8A, 8B, 8C, 8D, 8E:
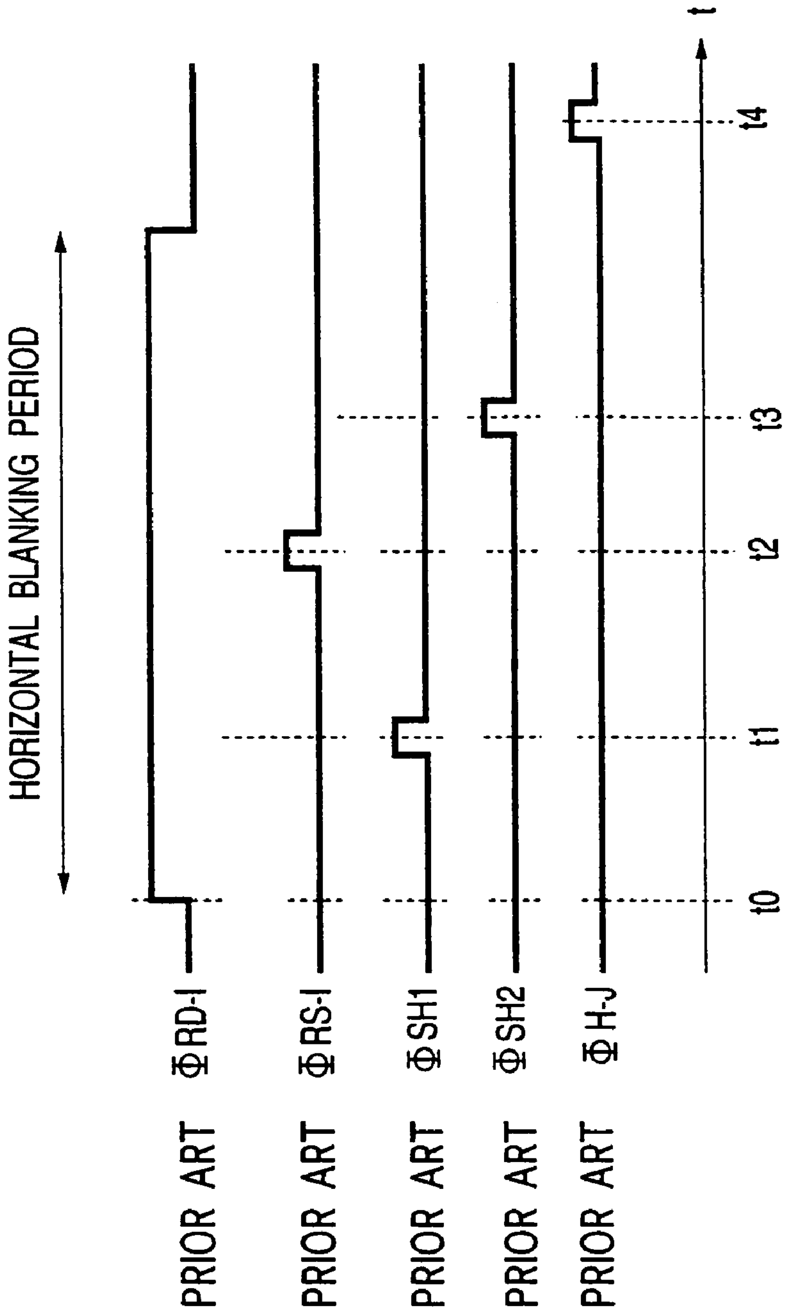
FIGS. 8A to 8E are timing charts illustrating the operation of the conventional imaging device comprising an FPN cancel reading circuit.

FIG. 3 is a diagram illustrating the structure of a solid state imaging element according to a second embodiment of the present invention.

In FIG. 3 showing the second embodiment, portions having the same structures and functions as those in the first embodiment have the same reference numerals.

With reference to FIG. 3 showing the second embodiment, portions having different structures and functions from those in the first embodiment will be described below.

In FIG. 3 showing the second embodiment, first of all, while a structure in which a pixel source wiring 24 connected from a pixel unit 1 is connected to a second constant current source 32 and a switch 33 provided in parallel with the second constant current source 32 is the same as that in the first embodiment, a circuit for recording the voltage signal of the pixel source wiring 24 is different.

More specifically, the pixel source wiring 24 in each column is connected to a sample hold capacitor 35 through a first sample hold switch 37 and a capacitor element 38, and a second sample hold switch 39 is provided on the sample hold capacitor 35.

A horizontal selecting switch 36 is provided between the sample hold capacitor 35 and a video output line 40.

The control terminal of the horizontal selecting switch 36 is connected to a horizontal scanning circuit 4.

FIGS. 4A to 4I are timing charts illustrating an operation according to the second embodiment.

With reference to the timing charts of FIGS. 4A to 4I, the operation according to the second embodiment will be described below.

In FIGS. 4A to 4I,

ΦSH1 is a pulse to be input to the control terminal of the first sample hold switch 37, and

ΦSH2 is a pulse to be input to the control terminal of the second sample hold switch 39.

First of all, ΦRD-I is set to H and an MOS type field effect transistor 12 for row selection of pixels in an Ith row are turned on at a time t0 for a horizontal blanking period.

At this time, ΦSSW is L and ΦDSW is H. Therefore, a source follower circuit is constituted by an MOS type field effect transistor 11 for reading amplification of a pixel unit 1 and a source side constant current source 32, and a voltage which is proportional to the electric potential of VPIX is follower output to the pixel source wiring 24.

At this time, the ΦSH1 is always H.

Next, the ΦSH2 is set to H at a time t1, and a signal corresponding to the follower output sent to the pixel source wiring 24 is stored in a sample hold capacitor 38.

Then, when the ΦSSW is set to H and the ΦDSW is set to L at a time t2, a drain side constant current source 30 and the MOS type field effect transistor 11 for reading amplification of the pixel unit 1 constitute an inverter circuit.

In this state, when the ΦRS1-I and the ΦRS2-I are set to H and a first reset switch 13 and a second reset switch 15 are turned on at a time t3, the input and output terminals of the inverter circuit are short-circuited. Consequently, the electric potential VPIX of the gate electrode of the MOS type field effect transistor 11 for reading amplification of the pixel unit 1 is reset to have a predetermined voltage VRS in the same manner as in the first embodiment.

In this state, when only the ΦRS1-I is set to L and the first reset switch 13 is turned off at a time t4, a reset noise to be ΔV1 appears on the VPIX.

However, the second reset switch 15 is on at this time. Therefore, the inverter circuit constituted by the drain side constant current source 30 and the MOS type field effect transistor 11 for reading amplification of the pixel unit 1 functions as an inversion amplifying circuit, and applies a negative feedback through the feedback capacitor 14 such that the VPIX is set to the VRS.

When the ΦRS2-I is switched to L and the second reset switch 15 is turned off at a time t5 that the feedback operation is fully stabilized, a reset noise ΔV2 is generated again.

A voltage fluctuation generated by the reset noise ΔV2 is suppressed by a buffer capacitor 16 and an amount for transmission to the VPIX is further suppressed through a series connection of the feedback capacitor 14 and the photodiode 10.

At a time t5, the ΦSSW is switched to L and the ΦDSW is switched to H at a time t5. Consequently, a source follower circuit is constituted between the MOS type field effect transistor 11 for reading amplification of the pixel unit 1 and the second constant current source 32, and the follower output of the gate voltage of the MOS type field effect transistor 11 for reading amplification appears on the pixel source wiring 24.

Subsequently, the ΦSH1 is set to L at a time t6 and a differential voltage between a signal stored at the time t1 and the pixel source wiring 24 after the reset of a pixel, that is, the offset signal of the pixel is stored in the sample hold capacitor 35.

Then, the horizontal blanking period is terminated and a horizontal scanning period is started at a time t7.

At a time t8, next, a horizontal selecting pulse ΦH-J in the Jth column is output from the horizontal scanning circuit 4 and a reading signal obtained after photoelectric charges of the pixel in the Ith row and Jth column are accumulated is output to the video signal line 40.

As described above, according to the second embodiment of the present invention, the reset noise of the pixel can be suppressed effectively, and furthermore, a difference between the reading signal and the signal of the reset pixel is taken. Consequently, it is possible to implement a solid state imaging device of high picture quality in which an offset variation is not caused.

As described above, according to the first and second aspects of the present invention, it is possible to provide a solid state imaging element having such a pixel structure and operation as to suppress a reset noise generated through the reset operation of the pixel and to implement a low noise and high picture quality which cannot be obtained in the conventional MOS type pixel for amplification without greatly departing from a general-purpose CMOS process.

According to the third aspect of the present invention, moreover, it is possible to provide a solid state imaging element in which an offset variation can be suppressed.

According to the fourth aspect of the present invention, the reset noise generated through the reset operation of the photodiode can be suppressed through the feedback circuit constituted by the first current source and the first MOS transistor and first capacitor. Consequently, it is possible to implement an amplification type MOS pixel having less random noises and high performance.

Furthermore, the pixel according to the present invention is constituted by only a general-purpose element through an ordinary CMOS process. Consequently, the conventional general-purpose CMOS process is less changed. Thus, it is possible to reduce a manufacturing cost.

According to the fifth aspect of the present invention, it is possible to suppress an offset variation for each pixel, and furthermore, to implement a solid state imaging device using an amplification type MOS pixel having high performance in addition to the effect of suppressing a reset noise which can be realized in the fourth aspect of the present invention.

FIG. 9 is a connection diagram showing the schematic structure of a charge detecting device according to an embodiment of the present invention.

As shown in FIG. 9, a charge input terminal 101 is connected to a ground potential through a capacitor C1 and to the negative input terminal (−) of an amplifier circuit 130.

The negative input terminal (−) of the amplifier circuit 130, that is, the charge input terminal 101 and the output terminal of the amplifier circuit 130 are connected through a first reset switch 104.

A feedback circuit constituted by a second reset switch 105 and a feedback capacitor C2 is connected in parallel with the first reset switch 104.

Then, a first reset pulse ΦRS1 is applied to a control terminal 114 of the first reset switch 104, and a second reset pulse ΦRS2 is applied to a control terminal 115 of the second reset switch 105.

Moreover, a capacitor C3 is connected between a terminal 200 connecting the second reset switch 105 and the feedback capacitor C2 and a ground electrode.

A reference voltage VREF is input to the positive electrode (+) side of the amplifier circuit 130.

The charge detecting device according to the embodiment of the present invention has the above-mentioned structure.

Next, the operation and driving method of the charge detecting device according to the embodiment of the present invention will be described with reference to the timing charts of FIGS. 10A, 10B and 10C.

FIGS. 10A, 10B and 10C show reset pulses ΦRS1 and ΦRS2 applied to the control terminal 114 of the first reset switch 104 and the control terminal 115 of the second reset switch 105 and the electric potential VIN of the charge input terminal 101 in time series along an operation sequence.

For simplicity of explanation, the first reset switch 104 and the second reset switch 105 are closed when the reset pulses ΦRS1 and ΦRS2 have a positive logic, respectively.

First of all, the electric potential VIN of the charge input terminal 101 is optional in the initial state before a time t1.

When the reset pulses ΦRS1 and ΦRS2 are input at the time t1, both the first reset switch 104 and the second reset switch 105 are closed. Consequently, the output terminal and the negative input terminal (−) of the amplifier circuit 130 are short-circuited.

Consequently, the amplifier circuit 130 operates as an analog buffer circuit. Therefore, the electric potential VIN of the charge input terminal 101 is set to a reference voltage VREF through a finite ramping period.

Next, when the ΦRS1 is changed so that the reset switch 104 is opened at a time t2, a thermal noise is generated on the electric potential VIN of the charge input terminal 101 through the switching operation of the first reset switch 104.

The thermal noise is generated for the ground capacitor value of the charge input terminal 101.

At the time t2, the second reset switch 105 is closed. Therefore, the capacitor C2 is also regarded as a ground capacitor equivalently.

Accordingly, the thermal noise ΔVIN(t=t1) generated at the time t1 is obtained as follows.

$$\Delta VIN(t=t1)=SQRT(kT/(C1+C2)) \quad (2)$$

wherein k represents a Boltzmann's multiplier and T represents an absolute temperature.

While a change in an electric potential on an offset basis is added to the actual circuit by the influence of the feed through caused by the switching of the first reset switch 104, it is omitted from the description of the operation for simplicity of explanation.

The thermal noise generated at the time t2 is input to the negative input terminal (−) of the amplifier circuit 130.

The amplifier circuit 130 carries out a correcting operation for a generated noise charge through the feedback capacitor C2.

Consequently, the terminal potential VIN of the charge input terminal 101 is returned to the reference voltage VREF again through a finite ramping period.

Next, after the terminal potential VIN of the charge input terminal 101 is fully stabilized to the reference voltage VREF, the reset pulse ΦRS2 is changed at the time t3 to open the second reset switch 105. Thus, the reset operation of the charge input terminal 101 is completed.

By the reset operation, a thermal noise expressed in Equation (3) is generated on a terminal 200 between the capacitor C2 and the second reset switch 105, and the thermal switch is also transmitted to the charge input terminal 101 through the capacitor C2.

$$\Delta V200(t=t3)=SQRT(kT/(1/((1/C1)+(1/C2))+C3)) \quad (3)$$

Based on a relationship in which the capacitor C2 and the capacitor C1 are connected in series, a fluctuation ΔVIN (t=t3) of the terminal potential VIN of the charge input terminal 101 which is finally generated at the time t3 through a series of reset operations described above is expressed in Equation (4).

$$\begin{aligned}\Delta VIN(t=t3) &= (C2/(C2+C1))\Delta V200(t=t3) \quad (4)\\ &= SQRT(kT/((C1+C2)\times C1/C2+\\ &\quad (C1+C2)\times(C1+C2)\times C3/(C2\times C2)))\end{aligned}$$

In the present embodiment, the above-mentioned reset operation is carried out. After the time t3, an original charge accumulating operation is started to input a signal charge to the charge input terminal 101.

Next, the feature of the present embodiment will be described.

In the conventional reset circuit, a reset noise is generated for the accumulation capacitor C. Therefore, a reset noise voltage of SQRT(kT/(C1+C2) is generated when resetting the charge input terminal is reset.

On the other hand, in the present embodiment, the noise voltage generated at the time t2 is corrected by utilizing the feedback circuit and the feedback system is then closed.

Consequently, it is possible to suppress a noise fluctuation during the reset up to a value expressed in the Equation (4).

For simplicity of explanation, C1>>C2 and C3>>C2 are set and the accumulation capacitor C of the charge input terminal 101 is set to C=C1+1/(1/C2+1/C3) of ~C1+C2. Consequently, a suppression ratio can be expressed in Equation (5) based on the Equation (4)/Equation (2).

Suppression ratio=(noise voltage of conventional method)/(noise voltage of the present embodiment)

$$\sim SQRT(1/(C1/C2+C1\times C3/(C2\times C2))) \quad (5)$$

By way of example, if the case of C1:C2=5:1 and C3:C2=10:1 is calculated, a suppression ratio of approximately one-thirteenth is obtained.

Moreover, the offset of an initial potential by the feed through of the reset switch 104 which has been omitted for simplicity of explanation can also be suppressed as indicated in the Equation (5) in the same manner as the reset noise.

Accordingly, the charge detecting device according to the present invention has the effects on the suppression of the offset amount by the feed through of the reset switch 104 as well as the thermal noise generated when the charge input terminal is reset.

As described above based on the embodiments, the present invention provides the charge detecting device for inputting an electric charge to the capacitor element for accumulation and detecting the electric charge wherein the charge input terminal is connected to the negative input terminal of the amplifier circuit and the first reset switch is provided between the output terminal of the amplifier circuit and the charge input terminal.

Moreover, the feedback circuit connecting the feedback capacitor and the second reset switch in series is provided in parallel with the first reset switch.

When the charge input terminal is to be reset, the first reset switch and the second reset switch are closed at the same time and the first reset switch is then opened, and the second reset switch is subsequently opened.

Consequently, the charge detecting device according to the present invention can suppress a reset noise generated in the switching operation and a fluctuation in the reset potential by the feed through of the reset switch, can initialize the charge input terminal with high precision and can detect an electric charge with high precision.

While one feedback circuit having a capacitor and a reset switch connected in series is added to the conventional charge detecting device in the above-mentioned embodiment, it is possible to constitute a charge detecting device which can produce the same effects by using the though of the present invention even if two or more feedback circuits are added.

As described above, according to the sixth to ninth aspects of the present invention, it is possible to provide a charge detecting device capable of reducing a thermal noise generated when resetting the electric potential of the charge input terminal and an offset caused by the feed through, thereby detecting the electric charges with high precision.

Additional advantages and modifications will readily occur to those skilled in the art. Therefore, the invention in its broader aspects is not limited to the specific details and representive embodiments shown and described herein. Accordingly, various modifications may be made without departing from the spirit or scope of the general inventive concept as defined by the appended claims and their equivalents.

What is claimed is:

1. A charge detecting device comprising:

a first capacitor element;

an amplifier circuit having a negative input terminal connected to an input terminal of the capacitor element;

a first reset switch connected in a feedback circuit connecting an output terminal of the amplifier circuit and the negative input terminal of the amplifier circuit; and at least one circuit connecting an output terminal of the amplifier circuit and the negative input terminal of the amplifier circuit in parallel with the feedback circuit having a second reset switch and a second capacitor element connected in series.

2. The charge detecting device according to claim 1, further comprising a control section for simultaneously bringing the first reset switch and the second reset switch into a conductive state, bringing the first reset switch into a non-conductive state after a first predetermined time, and bringing the second reset switch into a non-conducive state after a second predetermined time longer than the first predetermined time during reset.

3. A charge detecting device comprising:

an amplifier circuit;

a first capacitor element having one of ends connected to a negative input terminal of the amplifier circuit and the other end grounded;

a first feedback circuit connecting an output terminal and the negative input terminal of the amplifier circuit and having a first reset switch in a middle;

a second feedback circuit connecting the output terminal and the negative input terminal of the amplifier circuit and having a second reset switch and a second capacitor element connected in series in a middle; and a third capacitor element having one of ends connected in a middle of the second reset switch and the second capacitor element and the other end grounded.

4. The charge detecting device according to claim 3, further comprising a control section for simultaneously bringing the first reset switch and the second reset switch into a conductive state, bringing the first reset switch into a non-conductive state after a first predetermined time, and bringing the second reset switch into a non-conducive state after a second predetermined time longer than the first predetermined time during reset.

5. A charge detecting device for inputting an electric charge into a capacitor element for accumulation connected to a charge input terminal and detecting a signal charge accumulated in the capacitor element by means of an amplifier circuit, comprising:

a first reset switch having a negative input terminal connected to the charge input terminal and provided between an output terminal of the amplifier circuit and the charge input terminal;

a feedback circuit connecting a feedback capacitor provided in parallel with the first reset switch and a second reset switch in series; and a control section for simultaneously closing the first reset switch and the second reset switch when resetting the charge input terminal and then opening the second reset switch after opening the first reset switch.

* * * * *